(No Model.) 2 Sheets—Sheet 1.

W. M. WILKIN.
GANG SAW MILL.

No. 380,235. Patented Mar. 27, 1888.

Witnesses,
Wm A. Jones,
R. N. Porter.

Inventor,
Wm M. Wilkin,
per Hallock & Hallock
Att'ys

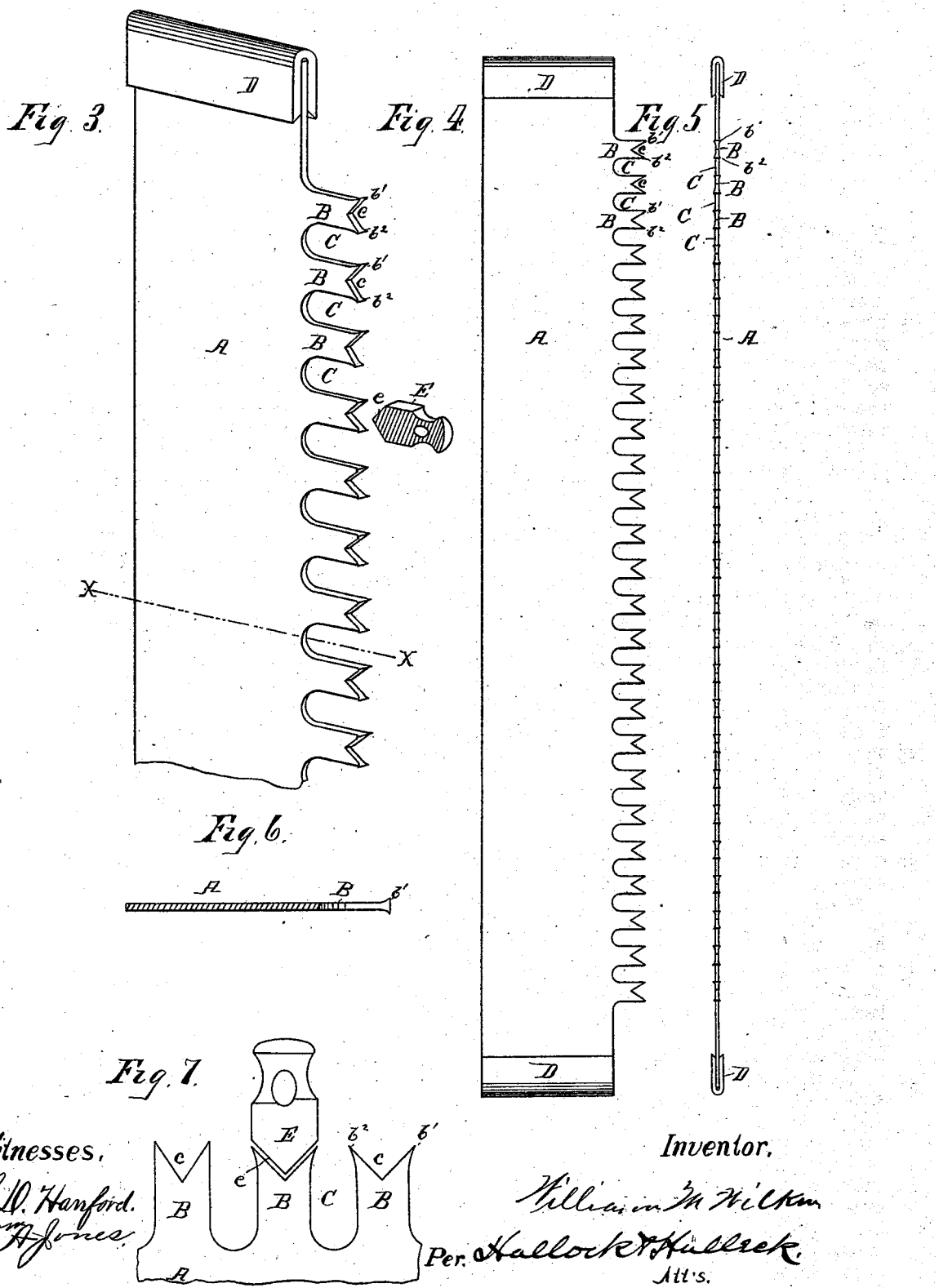

UNITED STATES PATENT OFFICE.

WILLIAM M. WILKIN, OF ERIE, PENNSYLVANIA.

GANG-SAW MILL.

SPECIFICATION forming part of Letters Patent No. 380,235, dated March 27, 1888.

Application filed March 24, 1887. Serial No. 232,302. (No model.)

*To all whom it may concern:*

Be it known that I, WILLIAM M. WILKIN, a citizen of the United States, residing at Erie, in the county of Erie and State of Pennsylvania, have invented certain new and useful Improvements in Gang-Saw Mills; and I do hereby declare the following to be a full, clear, and exact description of the invention, such as will enable others skilled in the art to which it appertains to make and use the same.

This invention relates to gang-saw mills; and it consists in certain improvements in the construction thereof, as will be hereinafter fully set forth, and pointed out in the claims.

Figure 1:
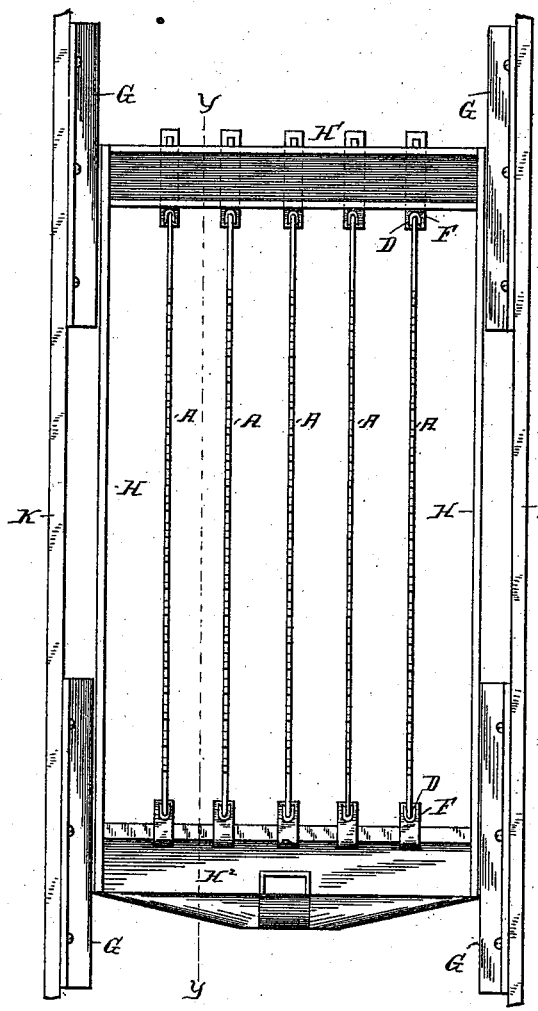
Figure 2:
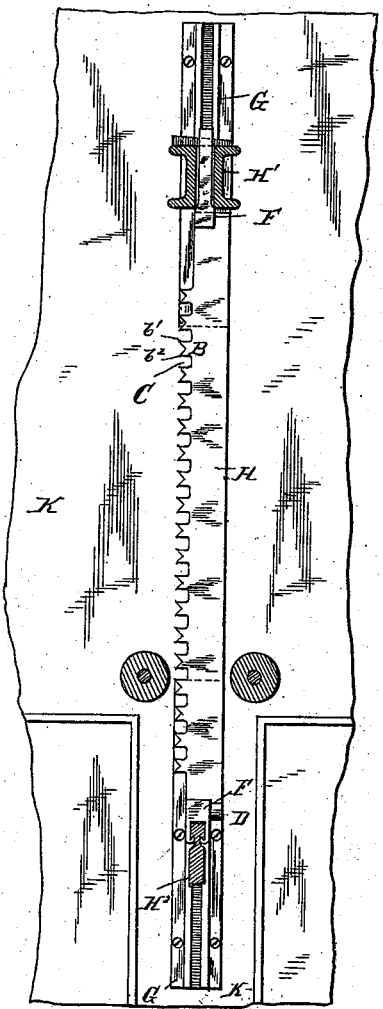

My invention is illustrated in the accompanying drawings as follows:

Figure 1 is a front elevation of a gang-saw mill, showing the saw-frame, saws, guides for the frame, and fragments of the main frame. Fig. 2 is a view, looking to the left from the line $y\ y$ in Fig. 1, showing the saw-frame in vertical section, and the saw, the guides, and a fragment of the main frame in elevation. Fig. 3 is a perspective view of a fragment of one of the saws. Fig. 4 is a side elevation of one of the saws. Fig. 5 is a front elevation of the same. Fig. 6 is a cross-sectional view of the same on the line $x\ x$ in Fig. 3. Fig. 7 is a side elevation of a fragment of the saw and the tooth-dressing swage E, and shows the manner of applying the swage.

Letters of reference designate parts as follows: K, the main frame; H H' H², the saw-frame; G G G G, the saw-frame guides; F F, the saw-buckles; D, the saw-tabs; A, the saws; B, the main teeth of the saw; $b'\ b^2$, the cutting-teeth; C, the spaces between the main teeth; $c$, the spaces between the cutting-teeth, and E the tooth-swage.

The improvement I have made in the construction of gang-saw mills rests on the fact that I provide a saw which will cut while moving up as well as down.

Where the saws of a reciprocating-saw mill cut only on one stroke of their reciprocation, as is now universally the case in mills for sawing lengthwise of the grain of the wood—that is to say, in mills for cutting lumber from logs—it is necessary that the saws be set in the frame so as to overhang the log, so as to give drag to the saws while going down and clearance from the log while going up; or the saw-frame must be given an oscillating as well as a reciprocating motion for the same purpose. The general practice is to oscillate the saw-frame, and this requires that the guides of the frame be put on what are called "cheek-pieces," which are pivoted, and gearing is provided for swinging these cheek-pieces as the saw reciprocates. By providing a saw that will cut both ways of its stroke I am enabled to dispense with all the appliances for oscillating the frame or setting the saws so as to overhang the log, for such a saw will do its work well when set vertically and moving in a vertical plane. I therefore greatly cheapen the construction of the mill and prolong its life, for by dispensing with the numerous parts and joints necessary to obtain oscillation of the frame the strength and durability of the mill are greatly increased. In addition to the above advantages, I add to the capacity of the mill, for by making the saw cut during the entire revolution of the driving-shaft, in place of during only one-half of such revolution, it is plain that much more work can be done. Such a mill will also produce cleaner lumber than when the saw cuts but one way, for when the saw cuts only one way the lower edges of the lumber are frayed or made slivery or ragged, while when the saw cuts both ways it is not.

Another advantage gained is that a saw cutting one way while cutting through a knot or cross-grained place in the log is apt to be deflected and make uneven lumber and bind in the cut and add greatly to the work, while a saw cutting both ways will not be so deflected, for the obstacle which tends to deflect the saw one way while moving in one direction will tend to deflect it in the opposite way while moving in the other direction, so that one cut corrects the defects of the other, and the saw makes a straight kerf.

In Figs. 1 and 2 I show a saw-frame, H H' H², similar to those now in use, with saws A A, which are so made as to cut both ways. This frame is mounted in vertical guides G G G G, which are fixed to the main frame K. All the parts necessary to give oscillation to the frame are omitted from this construction as unnecessary. The saws are set vertically in the frame, and the frame moves in a vertical plane.

A frame carrying saws such as I show may be oscillated, if desired; but it will have to be oscillated by different mechanism and in a different manner from a frame carrying saws that cut but one way. The saws are constructed by first gumming out the spaces C C to form the main teeth B, and then gumming out the spaces $c$ to form the cutting-teeth $b'$ $b^2$ on the ends of the main teeth. The cutting-teeth are then finished with chisel-points, the points of the teeth $b'$ being so formed that they will cut when the saw moves up, and the points of the teeth $b^2$ so that they will cut when the saw moves down. The points of the cutting-teeth $b'$ and $b^2$ should all lie in the same vertical plane—that is, the cutting-edge of the saw should be straight, as is clearly shown in Figs. 2 and 4.

In the operation of dressing the saw I use a V-shaped swage, which sets in the space and is of a more obtuse angle than the space $c$ $c$, and by driving upon this the cutting-points $b'$ $b^2$ are spread apart, and are afterward dressed with chisel-points, as is common in rip-saws.

The object in using the V-shaped swage is to upset and spread the ends of the main teeth, and so avoid filing the sides of these teeth, and thus keeping the spaces C of the same width at all points.

I am aware that crosscut-saws having their cutting-edges arched or in arc form have been made with teeth and spaces like B and C in my saw; but in such saws part of the main teeth are used for clearing the kerf of sawdust, and part are made with cutting-teeth set out in opposite directions and beveled or "fleamed," as it is called by saw-dressers, so as to serve as cross-cutting teeth. (See, for example, Patent No. 149,562, of April 14, 1874, granted to W. H. Bentley, and Patent No. 245,114, of August 2, 1881, granted to Joseph Ashenfelter.) In Patent No. 112,569, of March 14, 1871, granted to J. E. Emerson, a saw is shown in Figs. 4 and 5 which has no clearing-teeth, all the teeth being set to cut. The saws shown in these patents could none of them be used for the purpose for which I have provided the saw I here show. I believe I am the first to construct a rip-saw so it can cut on both strokes, and by this construction I am enabled to produce a reciprocating saw-mill for cutting boards from logs—that is, cutting up logs lengthwise of the grain—which will do more and better work in a given time, will cost less to construct, and endure longer than the same type of saw-mills now in common use.

The dressing-tool E which I show is not essential to the use of the saw, but its use will be advantageous.

In dressing the cutting-teeth it is not essential that they be full-swaged or full-chisel form, for any of the well-known methods of dressing rip-saw teeth may be employed.

What I claim as new is—

1. In a gang-saw mill, the combination, with a reciprocating saw-frame, of a series of rip-saws having a series of main teeth, B, separated by spaces C, and having at their ends oppositely-cutting chisel-pointed teeth $b'$ and $b^2$, the points of which are swaged outwardly in opposite directions into the adjoining spaces C in the operation of dressing the saw, substantially as set forth.

2. In a rip-saw for use in gang-saw mills, the combination of two sets of chisel-pointed cutting-teeth, $b'$ and $b^2$, one of which is dressed to cut as the saw moves up and the other as the saw moves down, the teeth of one set being placed between the teeth of the other set, the points of all the teeth being arranged in a common vertical plane, substantially as set forth.

In testimony whereof I affix my signature in presence of two witnesses.

WILLIAM M. WILKIN.

Witnesses:
  ROBT. H. PORTER,
  F. B. WHIPPLE.